United States Patent
Yoon

(10) Patent No.: US 6,675,026 B2
(45) Date of Patent: Jan. 6, 2004

(54) METHOD FOR EDITING TERMINATING RING TONE IN A MOBILE WIRELESS TERMINAL

(75) Inventor: Woo-Sun Yoon, Kumi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/918,729

(22) Filed: Jul. 31, 2001

(65) Prior Publication Data

US 2002/0052224 A1 May 2, 2002

(30) Foreign Application Priority Data

Oct. 31, 2000 (KR) ........................................ 2000/64365

(51) Int. Cl.$^7$ ................................................ H04B 1/38
(52) U.S. Cl. ..................................... 455/567; 455/556.2
(58) Field of Search ................................ 455/550, 556, 455/567, 558, 415, 557

(56) References Cited

U.S. PATENT DOCUMENTS

| 5,452,354 | A | * | 9/1995 | Kyronlahti et al. | ......... 379/375 |
|---|---|---|---|---|---|
| 6,094,587 | A | * | 7/2000 | Armanto et al. | ............ 455/567 |
| 6,308,086 | B1 | * | 10/2001 | Yoshino | ..................... 455/567 |
| 6,366,791 | B1 | * | 4/2002 | Lin et al. | .................... 455/567 |
| 2002/0010008 | A1 | * | 1/2002 | Borke et al. | ................. 455/567 |

* cited by examiner

*Primary Examiner*—William Trost
*Assistant Examiner*—Sharad Rampuria
(74) *Attorney, Agent, or Firm*—Dilworth & Barrese, LLP

(57) ABSTRACT

There is provided a method for editing terminating ring tones in a mobile wireless terminal with a memory in which a plurality of melodies are stored. The method comprises displaying a bell/melody selection menu, when a terminating ring tone editing key is input by a user, displaying a bell/melody editing menu, when a bell/melody editing item on the bell/melody selection menu is selected by the user; displaying a sequence designation menu for designating an output sequence of the melodies stored in the memory, when a sequence designation item on the bell/melody editing menu is selected by the user; and setting the output sequence of the melodies according to the sequence designated by the user, and storing the melodies in the memory in the set output sequence.

1 Claim, 4 Drawing Sheets

METHOD FOR EDITING TERMINATING RING TONE IN A MOBILE WIRELESS TERMINAL

PRIORITY

This application claims priority to an application entitled "Method for Editing Terminating Ring Tone in a Mobile Wireless Terminal" filed in the Korean Industrial Property Office on Oct. 31, 2000 and assigned Ser. No. 2000-64365, the contents of which are hereby incorporated by reference.

BACKGROUND OF THE INVENTION

1. Field of the Invention

The present invention relates generally to a mobile wireless terminal, and in particular, to a method for editing a terminating ring tone generated upon receipt of an incoming call in a mobile wireless terminal.

2. Description of the Related Art

A mobile wireless terminal such as a mobile telephone has a "terminating ring function" for informing the terminal user of an incoming voice call from other mobile wireless terminals or an incoming data call from various information providing servers. The terminating ring function includes a vibration mode and a melody mode that outputs a ring tone on terminating ring tone. In general, the term "terminating ring function" refers to the melody mode.

A conventional mobile wireless terminal is so designed as to generate a single terminating ring tone designated by the user upon receipt of each incoming call. When using the same terminating ring tone for a long period of time, the user may get tired of the designated terminating ring tone. To solve this problem, the existing mobile wireless terminal stores a plurality of tones or melodies in its internal memory and can download the melodies from a melody providing server via the Internet to also be stored in the memory. However, if the user desires to hear a new terminating ring tone upon receipt of every incoming call, he or she must manually change the presently set terminating ring tone to a desired one of the terminating ring tones before receipt of a next incoming call.

Therefore, there is a demand for a mobile wireless terminal which can easily set various terminating ring tones, so that the user can hear a new terminating ring tone at each incoming call.

SUMMARY OF THE INVENTION

It is, therefore, an object of the present invention to provide a terminating ring tone editing method for providing a user terminating ring tones that vary with each new incoming call, in a mobile wireless terminal having a memory in which a plurality of melodies are stored.

To achieve the above and other objects, there is provided a method for editing terminating ring tones in a mobile wireless terminal having a memory in which a plurality of melodies are stored. The method comprises displaying a bell/melody selection menu, when a terminating ring tone editing key is input by a user; displaying a bell/melody editing menu when a bell/melody editing item on the bell/melody selection menu is selected by the user; displaying a sequence designation menu for designating an output sequence of the melodies stored in the memory when a sequence designation item on the bell/melody editing menu is selected by the user; setting the output sequence of the melodies according to the sequence designated by the user; and storing the melodies in the memory in the set output sequence.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In an exemplary embodiment of the present invention, upon receipt of each incoming call, a wireless mobile terminal sequentially outputs a selected one of the melodies stored in its internal memory or outputs the melodies in a sequence designated by the user, thereby providing the user with a unique terminating ring tone upon receipt of each incoming call.

Figure 1:
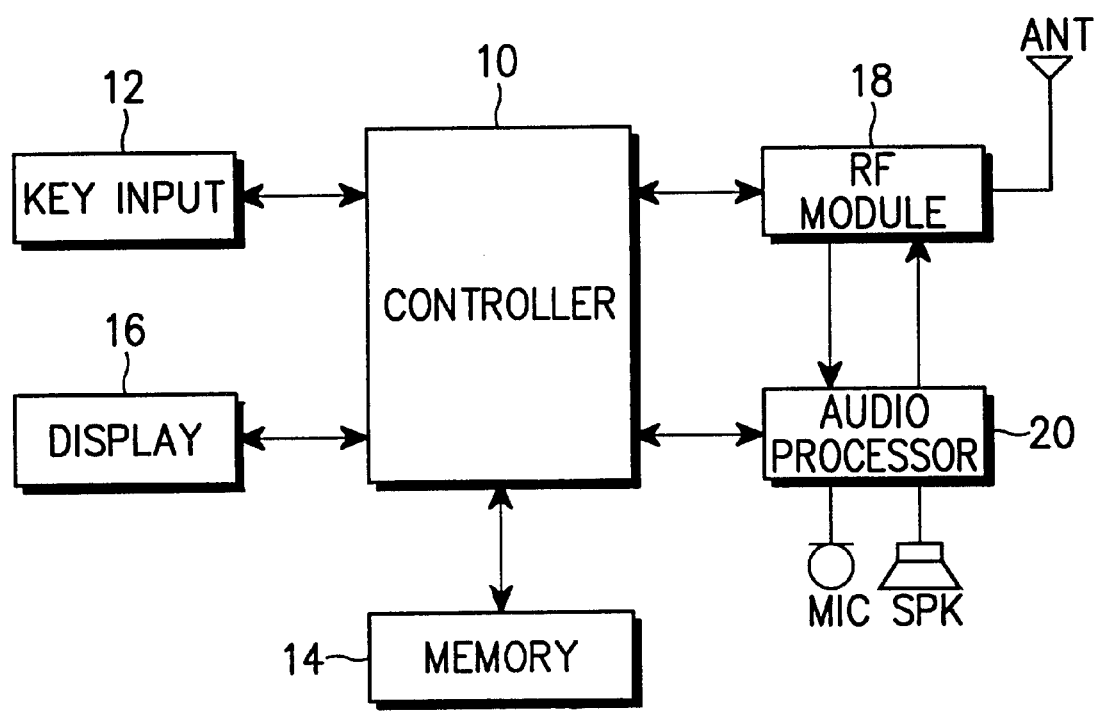
FIG. 1 is a block diagram illustrating a mobile wireless terminal to which the present invention is applied.

FIG. 1 illustrates a block diagram of a mobile wireless terminal to which the present invention is applied.

Referring to FIG. 1, a controller 10 controls overall operation of the mobile wireless terminal according to a control program stored in a memory 14. In particular, the controller 10 analyzes a terminating ring tone editing key input by the user and displays, on a display 16, terminating ring tone edition-related menus stored in the memory 14 and the items selected by the user in each editing step. Further, the controller 10 displays the melodies stored in the memory 14 on the display 16, and controls selecting and changing operations of the melodies. The memory 14 includes a program memory for storing the control program of the mobile wireless terminal and a data memory for storing data generated in the process of editing the terminating ring tone selections.

The memory 14 according to an embodiment of the present invention includes a storage area for storing a plurality of melodies used for providing the mobile wireless terminal with various terminating ring tones. A key input unit 12 includes a plurality of alphanumeric keys and function keys, and a specific key used for selecting menu items displayed on the display 16. The key input unit 12 generates key data according to a key input by the user and provides the generated key data to the controller 10. The display 16, for example an LCD (Liquid Crystal Display), displays operating status of the mobile wireless terminal under the control of the controller 10. Though not shown, the display 16 also includes an LED (Light Emitting Diode) used for visually informing the user of an incoming or outgoing call. An RF (Radio Frequency) module 18 modulates data output from the controller 10, converts the modulated data to an RF signal, and transmits the RF signal through an antenna ANT. Further, the RF module 18 converts an RF signal received through the antenna ANT to an IF (Intermediate Frequency) signal, demodulates the IF signal, and provides the demodulated signal to the controller 10. An audio processor 20, under the control of the controller 10, converts an analog audio signal input from a microphone MIC to a digital audio signal and converts a digital audio signal provided from the RF module 18 to an analog audio signal to output the converted analog audio signal through a speaker SPK.

Figure 2A:
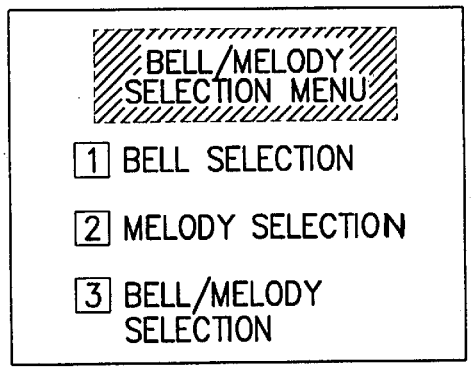
FIGS. 2A to 2D are diagrams illustrating menus displayed on a display unit of the mobile wireless terminal in the process of editing a terminating ring tone according to an embodiment of the present invention.
Figure 2B:
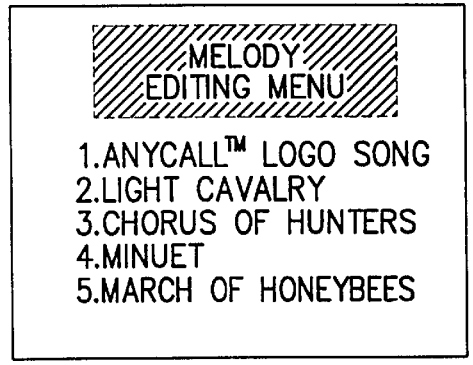
Figure 2C:
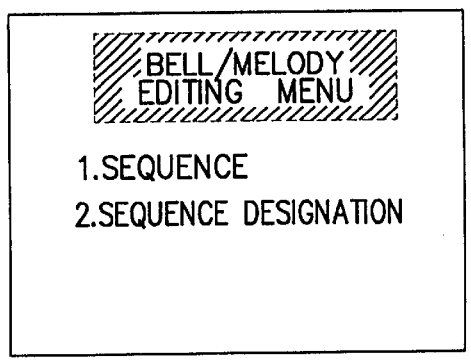
Figure 2D:
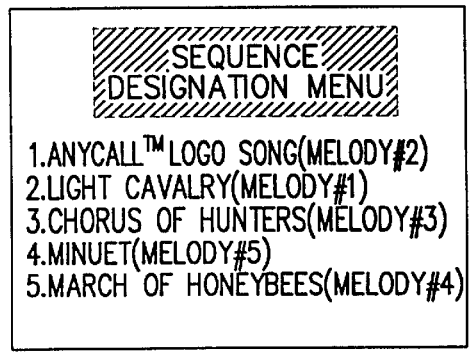
Figure 3A:
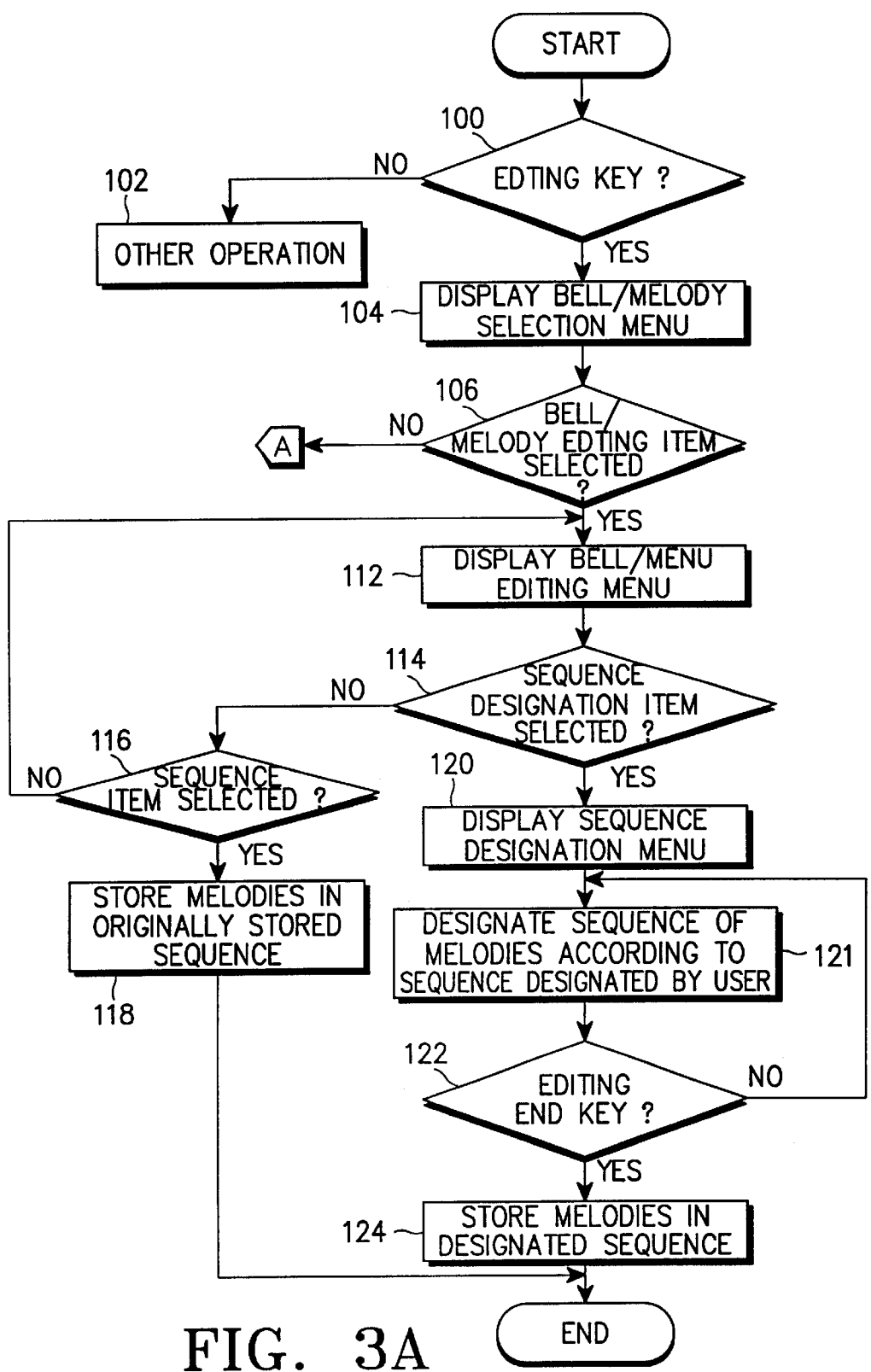
FIG. 3 is a flow chart illustrating a procedure for editing a terminating ring tone in the wireless mobile terminal according to an embodiment of the present invention.
Figure 3B:
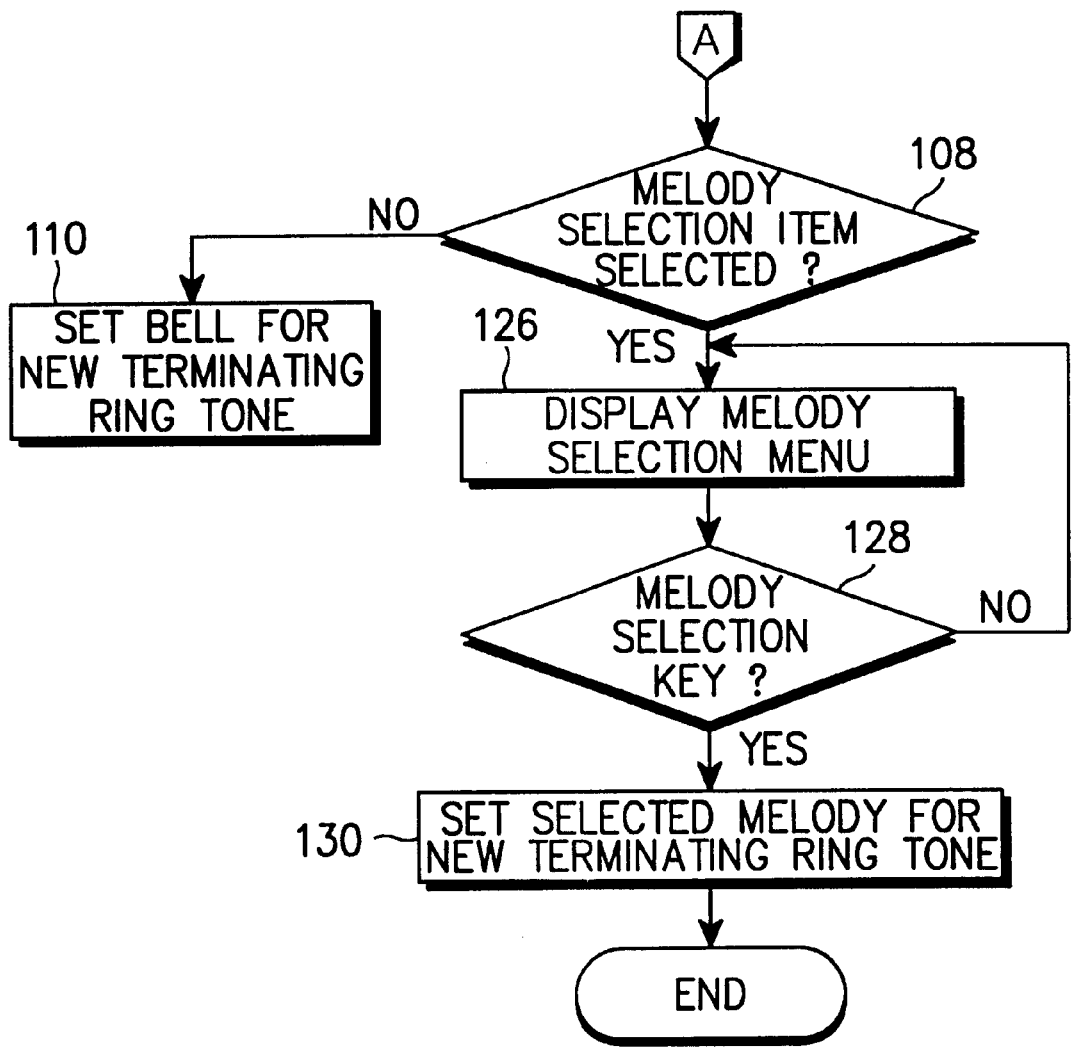

FIGS. 2A to 2D illustrate menus displayed on the display 16 of the mobile wireless terminal in the process of editing the terminating ring tone according to an embodiment of the present invention. Specifically, FIG. 2A illustrates a Bell/Melody Selection menu; FIG. 2B illustrates a Melody Selection menu displayed when a Melody Selection item is selected in FIG. 2A; FIG. 2C illustrates a Bell/Melody Editing menu displayed when the Bell/Melody Editing item is selected in FIG. 2A; and FIG. 2D illustrates a Sequence Designation menu displayed when a Sequence Designation item is selected in FIG. 2C. Further, FIG. 3 illustrates a procedure for editing a terminating ring tone in the wireless mobile terminal according to an embodiment of the present invention.

Now, a terminating ring tone editing method according to an embodiment of the present invention will be described in detail with reference to FIGS. 1 to 3. It will be assumed herein that a plurality of melodies used for editing the terminating ring tones are stored in the memory 14 in a predetermined sequence. Since the method for storing the melodies in the memory 14 is well known to those skilled in the part, the detailed description will not be provided.

The controller 10 determines in step 100 whether a terminating ring tone editing key is input by the user. When the terminating ring tone editing key is input by the user, the controller 10 displays the Bell/Melody Selection menu, shown in FIG. 2A, on the display 16 in step 104. If, however, a key input by the user is not the terminating ring tone editing key, the controller 10 proceeds to step 102 and performs an operation corresponding to the key input. The controller 10 determines in step 106 whether the Bell/Melody Editing item is selected by the user. If the Bell/Melody Editing item is selected by the user, the controller 10 displays the Bell/Melody Editing menu, shown in FIG. 2C, on the display 16 in step 112. Otherwise, if the Bell/Melody Editing item is not selected by the user in step 106, the controller 10 determines in step 108 whether the Melody Selection item is selected by the user. If the Melody Selection item is selected by the user, the controller 10 displays the Melody Selection menu, shown in FIG. 2B, on the display 16 in step 126. Otherwise, if the Melody Selection item is not selected by the user, i.e., if the Bell Selection item is selected by the user in step 108, the controller 10 proceeds to step 110. After step 126, the controller 10 determines in step 128 whether a melody selection key is input by the user. If the melody selection key is input by the user, the controller 10 sets the selected melody for a new terminating ring tone in step 130, and then ends the procedure.

After step 112, the controller 10 determines in step 114 whether the Sequence Designation item is selected by the user. If the Sequence Designation item is selected by the user, the controller 10 displays the Sequence Designation menu, shown in FIG. 2D, on the display 16 in step 120. Otherwise, if the Sequence Designation item is not selected by the user, the controller 10 determines in step 116 whether the Sequence item is selected by the user. If not, the process returns to step 112. If the Sequence item is selected by the user, the controller 10 stores the melodies in the originally set sequence in step 118. The process then ends. At this point, upon each incoming call, the controller 10 will output a different melody according to the originally set sequence. After step 120, the controller 10 stores the sequence of the melodies to be output as the terminating ring tones according to the sequence of the melodies that the user designates using the Sequence Designation menu, in step 121. The controller 10 determines in step 122 whether a sequence designation end key is input by the user. If the sequence designation end key is input by the user, the controller 10 stores the melodies in the memory 14 in the designated sequence in step 124, and then ends the procedure, if not, the process returns to step 121.

In step 110, the controller 10 sets the bell selected by the user for a new terminating ring tone. Since the operation of step 110 is not concerned with the bell/melody editing method according to the present invention, the detailed description will not be made.

The Sequence item of step 116 or the Sequence Designation item of step 114 is selected when the mobile wireless terminal is required to output a selected one of the melodies as the terminating ring tone, sequentially or in the sequence designated by the user, upon receipt of each incoming call. For example, referring to FIG. 2D, the mobile wireless terminal outputs the melody #1 "Light Cavalry" upon receipt of an incoming call, and then outputs the melody #2 "Anycall™ Logo Song" upon receipt of a next incoming call, continues through melodies #3–#5 and repeats the designated sequence.

As described above, the mobile wireless terminal according to the present invention stores a plurality of melodies in its internal memory and outputs a selected one of the melodies sequentially or in the sequence designated by the user, upon receipt of each incoming call, thereby providing various terminating ring tones to the user.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for outputting bells/melodies according to a designated sequence in a mobile wireless terminal having a memory in which a plurality of bells/melodies are stored, a display on which a bell/melody selection menu is displayed, and a key input unit generating a key signal for selecting an item of the bell/melody selection menu, wherein the display displays the bell/melody selection menu and, according to the key input at the key input unit, displays a bell/melody editing menu, and the memory stores selections made from the bell/melody selection menu according to the key input, the method comprising the steps of:

designating a sequence of bells/melodies to be stored in the memory in accordance with a signal corresponding to a key input at the key input unit designating a sequence of bells/melodies; and outputting one of the bells/melodies stored in the memory according to the designated sequence, wherein a different one of the bells/melodies is output in the designated sequence upon receipt of each successive incoming telephone call.

* * * * *